INVENTORS
ALFRED MARZOCCHI &
ALFRED WINSOR BROWN
BY
Staelin & Overman
ATTORNEYS

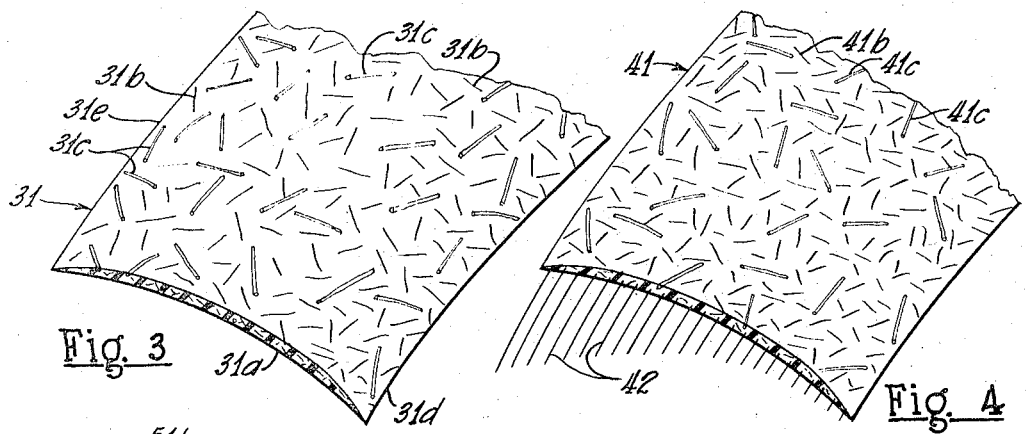
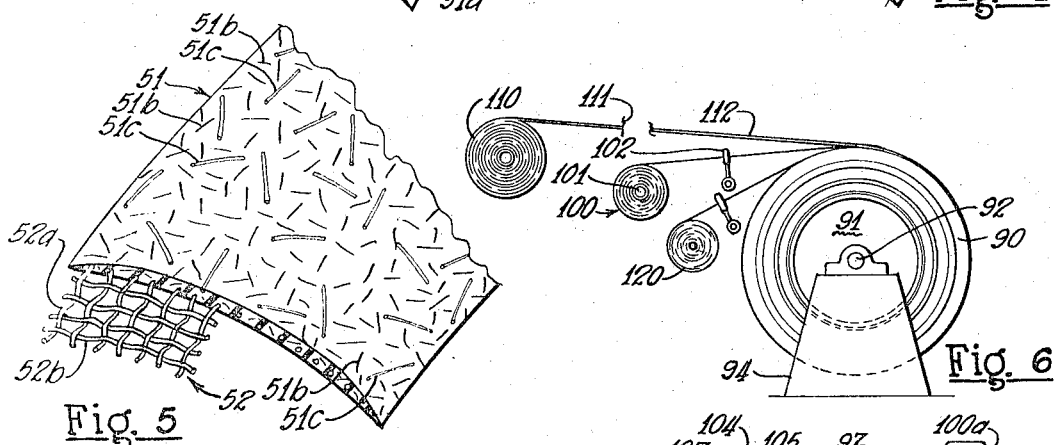
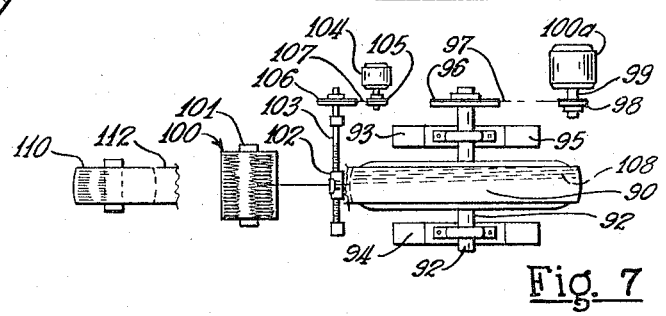
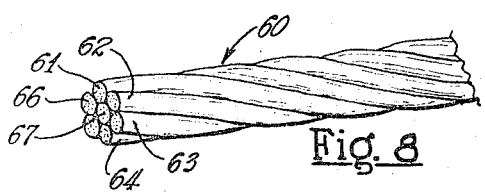

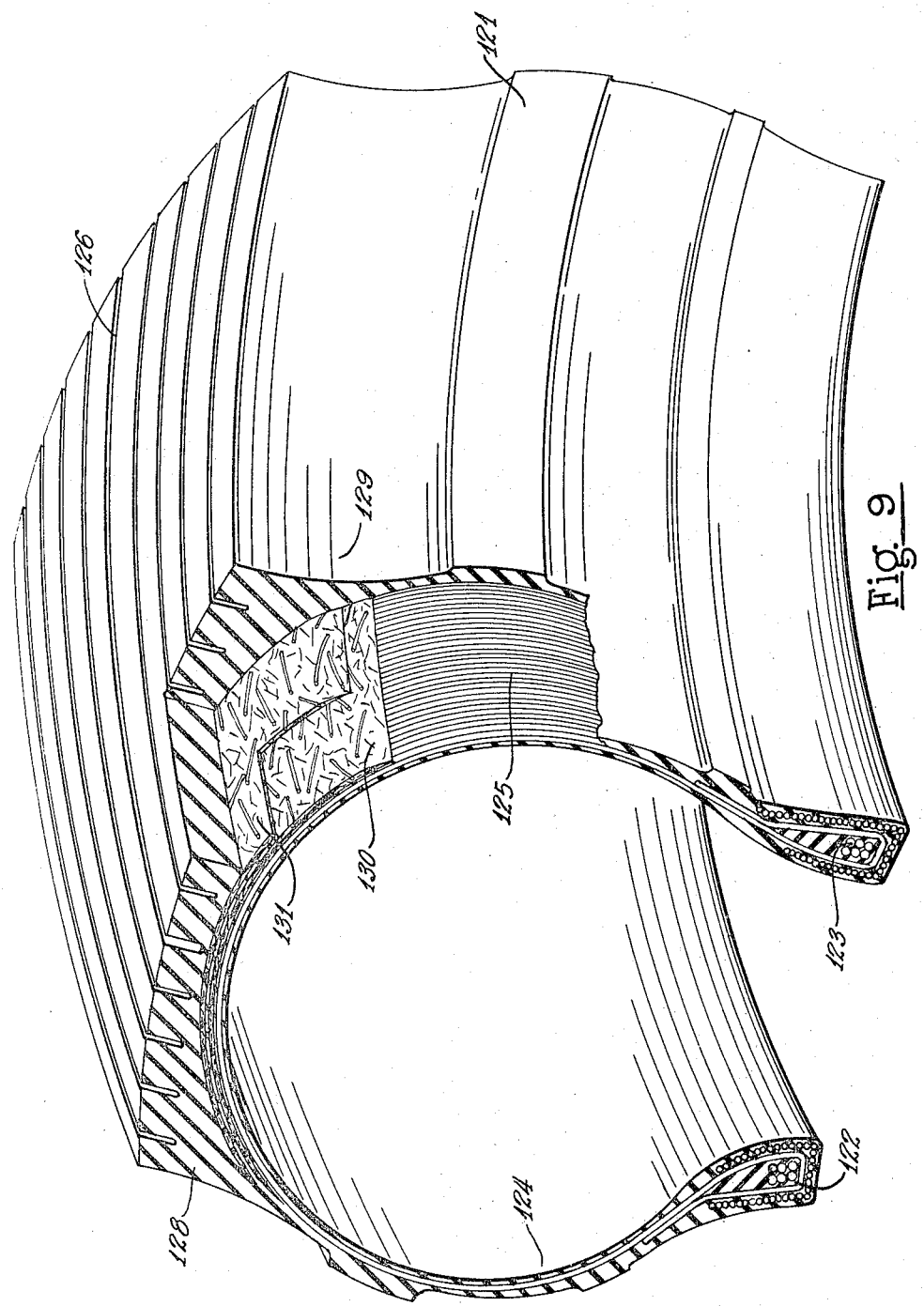

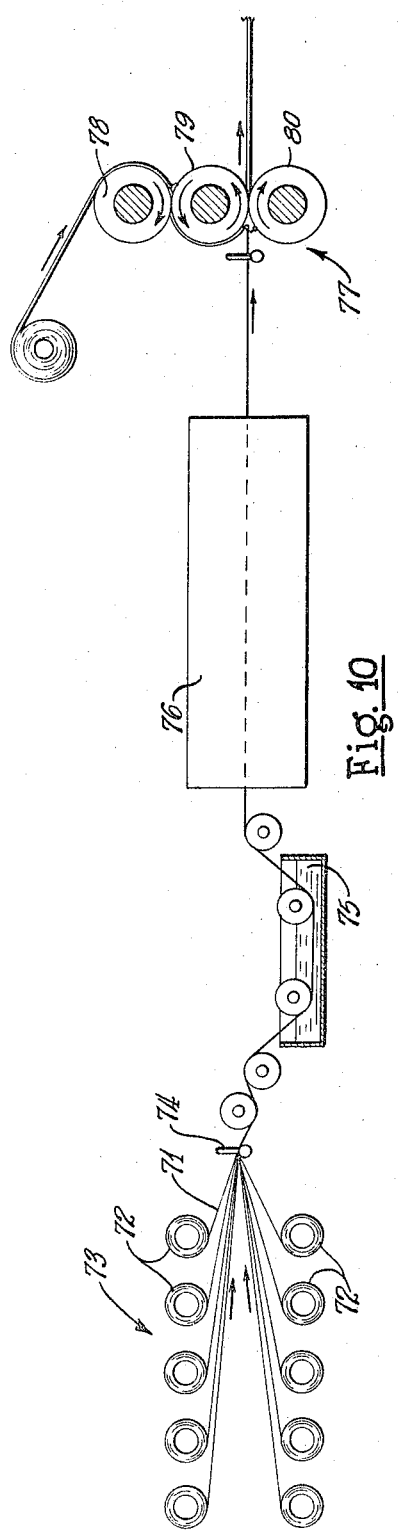

United States Patent Office 3,315,722
Patented Apr. 25, 1967

3,315,722
TIRE CONSTRUCTION WITH IMPROVED REINFORCEMENT
Alfred Marzocchi, Cumberland, and Alfred Winsor Brown, Woonsocket, R.I., assignors to Owens-Corning Fiberglas Corporation, a corporation of Delaware
Filed Apr. 26, 1965, Ser. No. 450,790
37 Claims. (Cl. 152—359)

The present invention relates to tires, particularly of the pneumatic type. More particularly, the present invention relates to tire constructions having in mind desirably preferred reinforcement features of construction.

Over the years, a number of textile materials have been suggested and employed as reinforcement components in various tire constructions. The earliest tires employed cotton in the form of a fabric; more recently, in the form of bias cut, mutually parallel strands of cotton. Even more recently, tire manufacturers have employed rayon and currently employ "nylon" as a reinforcing textile. In recent years, polyester, e.g., "Dacron," fibers, yarns and strands, and even wire cords, have entered the picture; each contributing its own particular features of advantage. Glass fibers have also been suggested as a candidate reinforcing component for pneumatic tires. See, for example, Thomas, U.S. Pat. No. 2,184,326; Boussu et al., U.S. Pat. No. 2,884,040; and Bourdon, U.S. Pat. No. 2,894,555.

Many of the textiles mentioned above, in addition to having their inherent advantages, have accompanying disadvantages. Cotton is deficient due to the inherent propensity to undergo moisture degradation. Rayon is not much stronger, is low in modulus and, in addition, is undesirable in certain respects because of its low strength per unit cross sectional area.

"Nylon" has found considerable acceptance by reason of its increased strength as compared to rayon, coupled with its toughness and high impact resistance which makes it extremely desirable in providing a tough carcass capable of withstanding considerable abuse. Another advantage of using fabric plies composed of synthetic linear filaments such as "nylon" in tire casings is that the filaments of "nylon" have a high tensile strength which makes it practical to manufacture heavy duty tires with relatively thin side walls and yet of relatively light weight, whereby less rubber is required and less heat is developed in actual case. Polyester as a reinforcing medium is not fully evaluated as yet, but appears to present some promise as a tire reinforcement.

"Nylon," with all of its advantages, is possessed of at least one serious drawback by reason of its thermal character. Thus, "nylon fabric, e.g., the "nylon" cords, tend to progressively and permanently become elongated when the tire is in service due to tension stresses to which the cords are subjected and the heat generated in the tire running under load. This characteristic of "nylon" cord causes the tire casings to increase in size, which sets up stresses in the treads which cause cracks to develop in the treads, greatly reducing the resistance of the tread to wear. Another ramification of the foregoing is the tendency of the "nylon" fabric reinforced tire to "thump" due to so-called "flat spotting." This is generally evidenced to the user by the fact that, after parking overnight, the tire cord will, due to the normal temperature drop, become heat set in a somewhat flattened contour caused by the depression on the bottom of the tire in contact with the pavement. This flat spot causes a noticeable "thump" when the car is run again, which albeit gradually disappears as heat is developed due to the load on the tire and the operational speed. This particular phenomena has been greatly credited with the failure of "nylon" cord tires to be utilized by automobile manufacturers as original equipment.

Conventional fabrics used heretofore are also possessed of the drawback that tires, regardless of the care taken in manufacture, are of irreproducible constant diameter. This is to say that tires produced in different factories, even though utilizing the same specification, fabrics, rubber stock, building techniques and cure cycles, will rarely have the same overall dimension. Tires made with conventional fabric plies are also found to experience variable change in dimensions after a given period of road use. This is particularly undesirable in the field of truck tires, since such tires are desirably retreaded. As a consequence, tires to be mounted on dual wheels must be individually paired by the user according to size in order to get an even match which will give satisfactory performance.

Conventional fabric (rayon, "nylon," etc.) reinforced tires of the bias type are generally not as stable as would be desired, particularly on "cornering." This lack of cornering stability resides in the conventional technique practiced in the design of tires generally. Thus, it is conventional in U.S. tire manufacturing to design the carcass construction (composed of a plurality of overlying bias plies), the tread, the side wall and the beads in such fashion that the whole structure functions integrally to define the optimum in wear properties of the tire. Under these design conditions, cornering stability of the tire suffers somewhat. On the other hand, tires of the Michelin type, employing radial cords with a reinforcing wire breaker strip just beneath the tread portion, provide a stability which is greater than tires of the bias type. However, this is accomplished only at a sacrifice in smoothness of ride, e.g., the ride is harsher.

Bias tires employing the conventional fabrics are also beset with the problem of tread movement of "squirming" as to that portion in contact with the road surface. This frequently results in the tread definition becoming distorted into a configuration inconsistent with that for which tread definition was designed.

With the foregoing general introduction, it may be stated that it is a general object of the present invention to provide a reinforcement system for pneumatic tires which provides features of advantage which in large measure overcome the drawbacks and deficiencies noted hereinabove.

It is another object of the present invention to provide a tire construction employing features of reinforcement which are novel, but yet readily adaptable into conventional tire manufacturing facilities.

It is yet another object of the present invention to provide a system of tire reinforcement which lends a happy marriage between improved wear, lack of "flat spotting" or "thump" and improved cornering properties.

It may be stated here parenthetically that stability is also evidenced in a tire in terms of a uniform "footprint," as it were. In conventional tire constructions employing bias cut ply reinforcement, the footprint of the tire, that is, the contour defined by the surface of the tire in contact with the road, varies considerably as the tire rolls along the pavement. Much of this, of course, is due to the variation in load due to imperfections in the road surface, valleys and crests of the road, cracks in the road, foreign objects, etc., which all serve to shift the load. On the other hand, what is more important is the character of the footprint as the tire corners, as it were. Here, a variation in the area of contact, in effect, changes the dynamic relationship of the center of gravity of the automobile and the road. This phenomenon explains why skids occur on cornering, resulting in accidents. Thus, the contour of the footprint changes, particularly in inclement weather, moisture, wet roads, damp roads, etc. Ideally, on cornering, the footprint should remain the same; namely, describing a generally square outline or, in any event, of rectangular contour. Where one of the sides of the footprint becomes curvilinear, for example, by the way of opposed intersecting catenary curves, then an unstable condition exists which can prove uncomfortable and even disastrous to the driver, depending upon the speed of the vehicle, the weight of the vehicle and, of course, the condition of the pavement, etc.

It is a particular object of the present invention to provide a reinforcement technique which overcomes the tendency to experience thermal set which is usually inherent in "nylon" cord reinforced tires.

It is additionally an object of the present invention to provide a method of building a tire which permits the production of tires of relatively uniform size and additionally results in a tire which retains uniform overall dimensions even after prolonged use.

It is still another object of the present invention to provide a method of building a tire which permits the production of tires having the above-enumerated advantages.

It is additionally an object of the present invention to provide a method of retreading tires, particularly of the off-the-road type or the aircraft type, wherein retreading is of considerable economic importance, having in mind the rigorous applications, endurance and related problems which such tires must endure. Aircraft tires, of course, must endure rigorous punishment in absorbing the tremendous load of the aircraft upon landing. Additionally, such tires must be capable of enduring high speed and contact with foreign objects on the runway. All of these place a considerable burden upon the tread. On the other hand, the side wall remains relatively unharmed so that it becomes economically expedient for such tires to be retreaded. By the present invention, we provide a convenient and practical method of retreading which includes a system for reinforcing the tire and additionally protecting it again penetration by foreign objects such as nails, bolts, nuts and other foreign objects likely to be encountered on the average airstrip.

The foregoing, as well as other objects of the present invention, will become apparent to those skilled in the art from the following detailed description taken in conjunction with the annexed sheets of drawings on which there are presented, for purposes of illustration only, several embodiments of the present invention.

The invention will be described in greater detail with particular reference to the annexed sheets of drawings in which:

FIG. 3 is a perspective view with a portion broken away, but showing a reinforcing band or belt representing a component of the reinforcement system illustrated in FIGS. 1 and 2;

FIG. 4 is a view similar to FIG. 3, but showing a modified construction of the reinforcing band in accordance with another embodiment of the present invention;

FIG. 5 is a view similar to FIGS. 3 and 4, but showing yet another alternative variant construction in accordance with yet another embodiment of the present invention;

FIG. 6 is a schematic side elevational view illustrating a manner of performing one method in accordance with the present invention;

FIG. 7 is a top plan view of the apparatus schematically illustrated in FIG. 6;

FIG. 8 is a perspective view of a particular cord construction constituting an assembly of strands composed of different filaments as representing a variant embodiment of the reinforcing system for pneumatic tires in accordance with the present invention;

FIG. 9 is a perspective view similar to FIGS. 1 and 2 and illustrating an alternative construction embodying a reinforcing system in accordance with another embodiment of the present invention; and FIG. 10 is a schematic side elevational view illustrating one manner of assembling a restrictive band construction representing one embodiment of the present invention.

Figure 1:
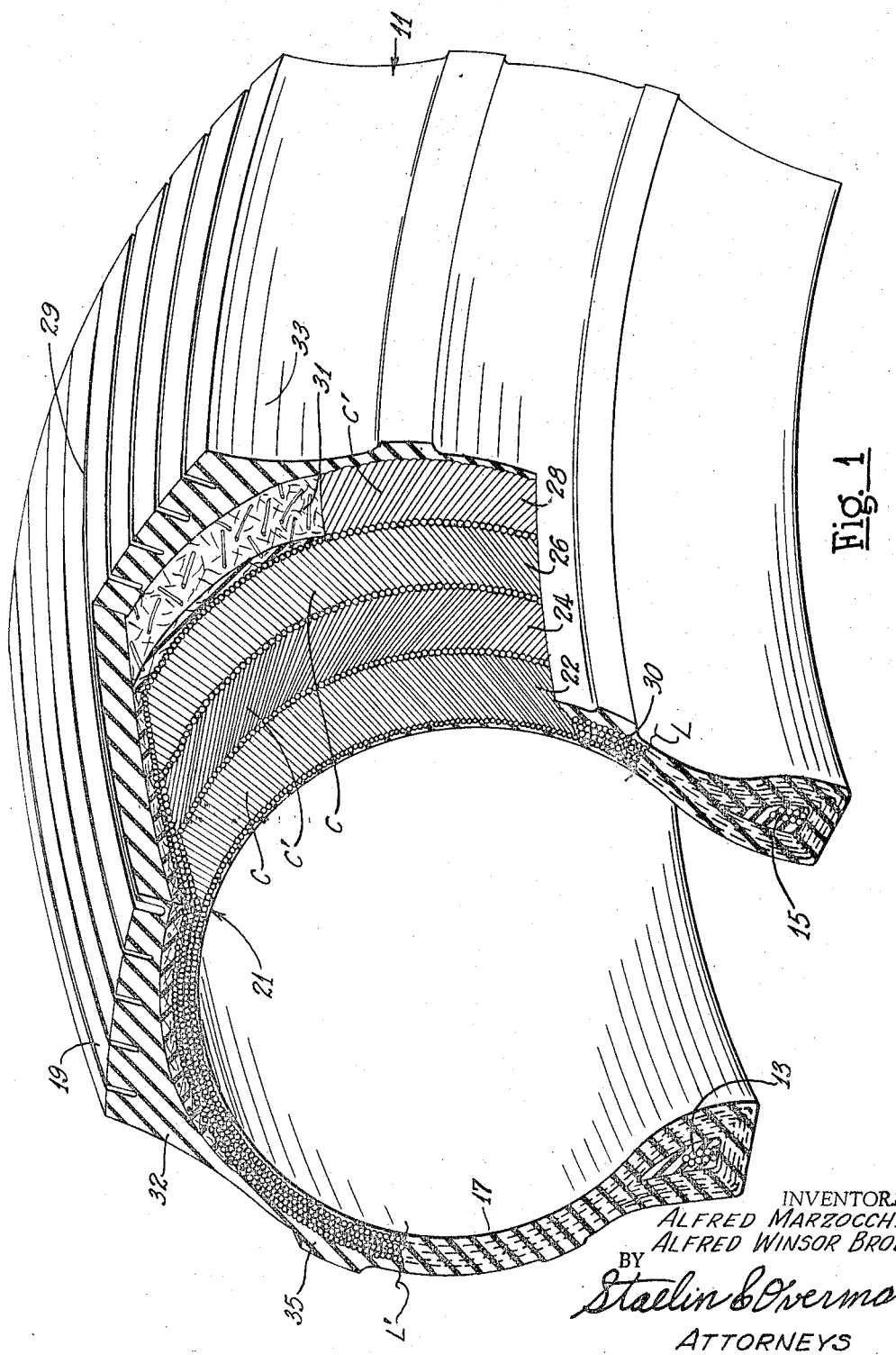
FIG. 1 is a generally three-quarter perspective view of a tire with the outer rubber ply broken away for purposes of showing the interior reinforcing construction representing a preferred embodiment of the present invention.

In its simplest embodiment, the present invention envisions a tire construction employing a restricting and/or reinforcing band located between the carcass plies and the tread and peripherally encircling the tire; the band being of a particularly specified construction employing the combination of individual, short filaments of glass fiber uniformly distributed throughout the band and, additionally, a plurality of individual lengths of cords of glass fiber relatively uniformly distributed throughout the band.

More specifically, the present invention envisions a tire construction employing bias cut plies of "nylon" cord and having a circumferential restricting band of elastomeric stock located peripherally about one or more of the "nylon" plies; said band having embedded therein a plurality of mutually parallel cords, bundles and/or strands of continuous inextensible material, e.g., glass, and also including short lengths of glass filaments.

At this point, definition of terms appears in order. A "filament" of glass is an individual fiber or solid rod, as it were. A strand, on the other hand, is a collection of a great plurality of individual filaments, usually varying from a grouping numbering in the neighborhood of 104, 208, and even up to 508–2000 individual filaments gathered together in a manner well-known in the art and technology of glass fiber manufacture.

A "cord," "bundle" or "cable," on the other hand, comprises a plurality of strands, for example, 2 to 30, and even up to 50 strands, plied or assembled together continuously. The strands may be possessed of twist, reverse twist, or no twist. Further, a number of strands of several ply constructions, e.g., 3 strands, may be combined to yield an ultimate cord having a total number of strands equal to the product of the number of strands in the first assembly and the number of these assemblies that are combined to make up the final cord. As can be appreciated, a cord will be composed of a large number of individual filaments, say in the neighborhood of 300 to 2000. By way of illustration, a cord construction may feature 3 strands of continuous filaments gathered together with or without twist. Additionally, 10 of the just-foregoing 3-ply strand assemblies may be joined together with or without twist to form, in effect, a 30-strand assembly; each strand being composed, for example, of perhaps a 100 to 200 filaments yielding a 3000 to 6000 filament "cord," "cable" or "bundle" assembly. A 30,000 filament assembly cord is achieved by (1) forming a 10-strand assembly; (2) combining 5 of these to form a 50-strand assembly; and (3) finally combining 3 of the latter to yield a 150-strand cord. The cord designation for the latter is 10/5/3.

The present invention envisions a restrictive band featuring the employment of an elastomeric stock system which includes therein both filamentized short lengths of glass fibers and, additionally, unfilamentized or unseparated "bundles" or "cords" of glass fibers. Most desirably, the reinforcing fibers and cords are selected of a given range of lengths. It is additionally envisioned that the elastomeric stock system, forming a restrictive band in accordance with the present invention, may contain continuous mutually parallel lengths of strands or cords separated one from the other and perhaps proceeding in spiral fashion or filament-wound fashion about the periphery of the tire radially outwardly of the reinforcement fabric, yet beneath the tread portion. In some cases, the continuous strands are arranged so that they extend into the tread portion where such would be desirable.

To illustrate the potentiality of glass fiber as a reinforcing component of tires in dynamic application, the properties of a single filament of glass fiber are listed in Table I.

TABLE I.—GLASS FIBER SINGLE FILAMENT PROPERTIES

| | |
|---|---|
| Tensile strength _____ p.s.i__ | 500,000 |
| Tenacity _____ g.p.d__ | 15.3 |
| Ultimate elongation _____ percent__ | 4.8 |
| Elastic recovery _____ do____ | 100 |
| Toughness _____ p.s.i__ | 11,900 |
| Modulus _____ p.s.i__ | 10,500,000 |
| Coefficient of thermal expansion _____ ° F__ | $2.8 \times 10^{-6}$ |
| Water adsorbency _____ percent__ | 0.3 |
| Moisture regain _____ do____ | 0.0 |

While the glass fibers in the form of fibers, strands, cords or bundles can be introduced into the elastomeric stock as is, so to speak it is most effective for the glass fibers to be first treated or sized, as it were, to provide a protection against interfilament destructive action. This can be overcome by a combination of treatments to provide a protective coating as well as a bonding and anchoring agent on the surface which will enhance the bonding between the glass fiber surface and the elastomeric material. This is usually accomplished by a combination of sprayed-on liquid size treatments just after the glass filament is formed and a subsequent impregnation of the strands or cords as they are formed, usually simply by introducing the gathered filaments into a pool of the treating liquid while simultaneously distorting the strand filaments to effect penetration into the zones between fibers, thereby insuring complete impregnation. Following impregnation, the coated strands or cords are given a mild heat treatment to set the treating agent. A system of treatment for glass fibers may involve a first surface treatment embodying an anchoring agent which enhances the bonding relationship between the glass fiber surface and the ultimately used elastomeric material. A suitable anchoring agent is represented by the amino silanes such as gamma-aminopropyltriethoxy silane or by a similar silane having a carboxyl group in the organic group attached to the silicon atom or an amino or carboxyl group in the carboxylato group of a Werner complex compound. These may be applied to the glass fiber surfaces or incorporated as a component of a size composition and applied to the glass fibers as they are gathered together in the formation of strands, yarns or the like; all of which is more fully described in the copending application Ser. No. 406,501, filed Oct. 26, 1964, entitled "Glass Fibers Treated for Combination With Elastomeric Materials and Method." A desired strong bonding relationship can also be achieved by the impregnation of the strands or other multi-filament glass fiber structure with a composition formulated to contain, in addition, an elastomeric material, preferably in an uncured or an unvulcanized state as described in the aforesaid copending application Ser. No. 406,501, as will hereinafter be illustrated by way of examples.

For purposes of comparison, the following table lists the reinforcement cord properties comparing glass "cords" with organic cords.

TABLE II.—REINFORCEMENT CORD PROPERTIES GLASS FIBERS VERSUS ORGANIC CORDS

| | Glass Fibers | Rayon | "Nylon" | Polyester |
|---|---|---|---|---|
| Strength, p.s.i. | 407,000 | 94,000 | 122,000 | 104,000 |
| Toughness, p.s.i. | 9,900 | 5,800 | 10,200 | 9,900 |
| Impact Resistance, ft. lbs. ×10⁻⁴/denier | 3.95 | 1.87 | 4.08 | 3.41 |
| Modulus, p.s.i.×10⁻⁶ | 8.45 | 0.96 | 0.63 | 0.57 |
| Elongation, percent | 4.8 | 9.8 | 19.3 | 18.5 |

The properties appearing in the foregoing Table II speak generally for themselves. They generally demonstrate the toughness and impact strength of glass fiber cords. This, coupled with their high dimensional stability, demonstrates their great utility. Additionally, this, coupled with their relatively inert character to temperature or humidity changes, makes them a desirable and, in fact, an ideal tire reinforcement material when used in the manner disclosed herein. The problem, of course, has been in converting the well-known static properties of glass fibers into a construction which would endure dynamic stresses. The present invention solves this dilemma by reason of the novel conjoint employment of filamented short length filaments, unseparated chopped bundles, strands or cords and, in a preferred embodiment, employment in the same band of elastomeric stock of mutually parallel strands, cords or bundles of a continuous nature.

The following are representative of size compositions which may be applied to the glass fibers in forming.

*Example 1*

| | Percent by wt. |
|---|---|
| Gamma-aminopropyltriethoxy silane _____ | 0.5–2.0 |
| Glycerine _____ | 0.3–0.6 |
| Water _____ | Remainder |

*Example 2*

| | |
|---|---|
| Partially dextrinized starch _____ | 8.0 |
| Hydrogenated vegetable oil _____ | 1.8 |
| Lauryl amine acetate (wetting agent) _____ | 0.4 |
| Non-ionic emulsifying agent _____ | 0.2 |
| Glycylato chromic chloride _____ | 1.0 |

*Example 3*

| | |
|---|---|
| Saturated polyester resin _____ | 3.2 |
| Pelargonate amide solubilized with acetic acid ___ | 0.1 |
| Tetraethylene pentamine stearic acid _____ | 0.1 |
| Polyvinyl alcohol _____ | 0.1 |
| Polyvinyl pyrrolidone _____ | 3.0 |
| Gamma-aminopropyltriethoxy silane _____ | 0.3 |
| Acetic acid _____ | 0.1 |
| Water _____ | 93.1 |

The size composition is merely applied to the glass fiber filaments as they are gathered together and the strand of sized glass fibers is allowed to dry in ambient air.

In the foregoing examples, the gamma-aminopropyltriethoxy silane can be replaced as an anchoring agent with other amino silanes such as gamma-aminopropylvinyldiethoxy silane, n-(gamma-triethoxysilylpropyl)propylamine, beta-aminoallyltriethoxy silane, aniline silane derivatives, etc.

While it is not essential to impregnate the strand or bundle of glass fibers before cutting or chopping to the lengths desired for admixture with the elastomeric material in forming the molding compound, it is preferred to impregnate the bundle of glass fibers for fuller separation of the fibers one from the other in the bundle and to incorporate an elastomeric system into the interior of the glass fiber bundle whereby the fibers can more effectively become anchored in the elastomeric system.

For this purpose, the strand or yarn of glass fibers is simply unwound from a supply drum and advanced submergedly into a bath of the elastomeric impregnant. Thence, the impregnated yarn is pulled through a wiping die which works the impregnating liquid into the innermost regions of the bundle or strand and also serves to wipe off excess material.

The following are a few representative liquid compositions containing an elastomeric material which may be used to impregnate the bundle or strand of glass fibers:

*Example 4*

| | Parts by wt. |
|---|---|
| Neoprene rubber | 100 |
| Powdered magnesium oxide | 4 |
| Powdered zinc oxide | 5 |
| Channel black | 15 |
| Thiate B (trialkyl thiourea accelerator) | 1 |

The above ingredients after being mixed on a mill are combined with sufficient of an appropriate rubber solvent to form a liquid impregnant bath.

*Example 5*

| | Parts by wt. |
|---|---|
| Paracril C rubber (Buna N) | 100 |
| SRF carbon black | 25 |
| Powdered zinc oxide | 5 |
| Aminox (reaction product of diphenyl amine ester) | 0.5 |
| Stearic acid | 1 |
| Dicumyl peroxide | 40 |

The above ingredients after being mixed on a mill are combined with sufficient of an appropriate rubber solvent to form a liquid impregnant bath.

*Example 6*

| | Parts by wt. |
|---|---|
| Lotol 5440 (U.S. Rubber Company Lotol 5440 is a 38% dispersed solids system including a butadiene-styrene-vinyl pyridine terpolymer latex, a butadiene styrene latex and a resorcinol-formaldehyde resin) | 60 |
| Water | 39 |

*Example 7*

| | |
|---|---|
| Resorcinol formaldehyde resin | 2 |
| Formalin (37% solution) | 1 |
| Concentrated ammonium hydroxide | 2.7 |
| Vinylpyridine terpolymer (42% latex) | 25 |
| Neoprene rubber latex (50% solids) | 41 |
| Butadiene latex (60% solids) | 5 |
| Sodium hydroxide | .05 |
| Gamma-aminopropyltriethoxy silane | 1 |
| Vulcanizing agent | 1 |
| Water | 1100 |

The impregnated cord or strand may be chopped to different sized lengths and thence incorporated into the elastomeric stock material in order to produce the vulcanizable restrictive band referred to earlier herein. Any type of commercial cutter may be employed to automatically cut the strands into lengths ranging from 1/8 to 3 inches in length. One cutter which has been utilized is called a Brenner cutter and is manufactured by Brenner Machine Company of Newark, Ohio. Another suitable cutter is manufactured by Turner Machine Company of Danbury, Conn.

To produce a glass reinforced elastomeric system in accordance with the present invention, a conventional rubber formulation, e.g., recipe, is introduced onto a mill and worked to a proper workable viscosity; care being taken not to scorch the elastomeric stock material. Then, 2 parts per hundred parts of rubber (hereinafter referred to as phr.) of treated impregnated glass cords or strands are gradually introduced to the mill which is set with the roll surfaces spaced apart about 0.055 inch. The stock on the mill is repeatedly cut and crossed to work the glass fiber such that the bundles or strands separate into individual filaments and thereby become intimately and homogeneously diffused throughout the mass. Next, anywhere from 5 to 75 phr. of additional lengths of chopped impregnated cord having a length of about 1/4 to 3 inches are introduced to the mill at the same setting or slightly smaller setting ranging down to 0.035 inch. When this addition has been completed, the material is allowed to stay on the mill for only a couple passes so that the bundles, strands or cords do not become separated into individual filaments, but substantially retain their bundle or "cord" identity. The material is then removed from the mill and cut to a band width, generally corresponding to the shoulder to shoulder dimension of the tire to which it is to be affixed. The band width on examination will be found to contain both individual filaments of glass ranging from 1/64 to 1/4 inch in length and lengths of cord assemblies measuring from 1/4 to 3 inches in length. The short lengths of individual filaments result from the working and breaking up of the initial addition of 2 phr. of glass bundles. A band, as just described, is circumferentially wrapped about a "nylon" cord carcass ply construction on a tire building machine just prior to application of the tread stock strip. The mating edges can be chamfered in accordance with routine practice and the lateral edges can also be biased or "feathered" for smooth incorporation into the tire construction. Thereafter, the tire construction proceeds with the arrangement of the tread stock, setting of the beads and finally the vulcanization of the tire, yielding a finished tire embodying the present invention.

Referring now more particularly to the drawings, there is shown in FIG. 1 a tire 11 composed of spaced parallel circular bead wires 13 and 15 connected by the carcass portion 17 extending in toroidal configuration from one bead to the other. The beads are adapted to engage spaced rim flanges (not shown) on a vehicle wheel. The tire includes an outer peripheral tread portion 19 which serves as the ground contacting component of the tire. From the inside out, the carcass is composed of an inner cushion ply 21 extending from bead to bead and successively plies 22, 24, 26 and 28 of bias cut "nylon" fabric in which the principal cords C and C' are mutually parallel with the same cords in the same ply and are at an acute angle to the peripheral center line 29 of the tire which is coincident with the peripheral rolling axis of the tire. The cords C in the carcass plies 22 and 26 described the same angle, while the cords C' in carcass plies 24 and 28 define an angle opposite to that of the cords C. The alternate reverse arrangement of the bias cut plies lends dynamic stability to the tire carcass considered as a whole. The carcass plies extend from bead to bead and then are wrapped reversely to extend up into the side wall, as generally indicated by the reference numeral 30. The ply construction is shown in dotted outline from the break line L and L' in the side wall down to the corresponding bead area in the interest of simplicity of illustration.

In accordance with the present invention, a restrictive band 31 is situated peripherally about the outer bias cut "nylon" cord ply 28 and beneath the tread 19 extending transversely from shoulder 32 on the left to shoulder 33 on the right; the latter being the smooth curve of juncture between the tread stock and the outer rubber ply 35. In the embodiment of FIG. 1, the restrictive reinforcing band 31 extends one complete wrap about the periphery of the tire with the mating edges chamfered and overlapping, although not shown, in a manner similar and customary in the splicing of the tread ply in conventional tire building operations.

The reinforcing band 31 is shown somewhat enlarged in FIG. 3 and, as can be seen, is composed of an elastomeric stock 31 having embedded therein discrete fibers 31b of glass fiber in essentially filament form and bundles or strands 31c of unseparated fibers. The lateral edges 31d and 31e of the restrictive band 31 are desirably feathered for more uniform and unified integral joining with the other tire components during building and vulcanization. The unseparated bundles contained in the restrictive band of elastomeric stock (rubber) can vary in amount from a minimum of about 5 phr. to as much as about 75 phr. Preferably, the range is 15 to 50 phr.

and the optimum in reinforcing value is achieved where the amount is about 30 to 35 phr.

Figure 2:
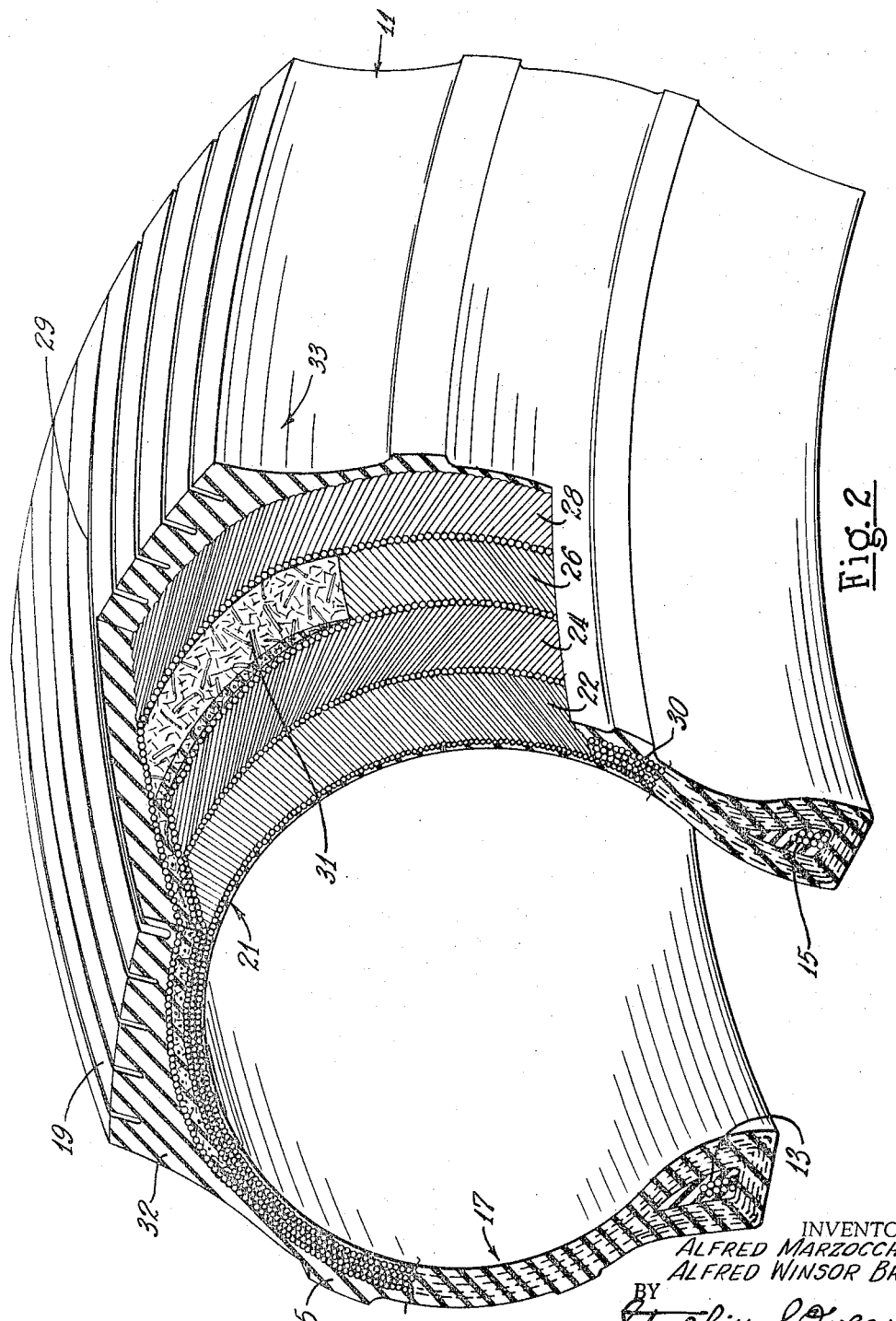
FIG. 2 is a view similar to FIG. 1, showing an alternative construction in accordance with another embodiment of the present invention.

Referring now to FIG. 2, the tire 11 is composed of parts bearing the same reference numeral as the tire 11 in FIG. 1. The tire 11 of FIG. 2 is substantially identical to the tire 11 of FIG. 1 with the exception that the restrictive reinforcing band 31 is situated between bias cut "nylon" fabric plies 26 and 28. The tire construction employing the reinforcement system as described in either of the embodiments of FIG. 1 or FIG. 2 is capable of being built in accordance with conventional tire building techniques in the tire manufacturing industry. The restrictive band 31 in each case extends transversely from shoulder to shoulder.

The restrictive band 31 including the reinforcing filaments and reinforcing bundles or strands can be produced, in general, by milling, calendering and/or extrusion; although the latter is less desirable since the distribution of the reinforcing system is not as uniform as with either milling or calendering. The restrictive band may vary in thickness from about 0.020 inch to about 0.125 inch. A thickness of 0.050 is ideal for passenger tire constructons. Tires constructed in accordance with either of the embodiments of FIGS. 1 and 2 were found to minimize "flat spotting" or "thumping" due to the "nylon" cord bias plies propensity to set at the deflected condition on exposure to low temperatures. A number of tires embodying the construction illustrated in FIGS. 1 and 2 were measured and found to be considerably more uniform in diameter at the same inflation pressure varying by as little as ¼ inch to ⅜ inch.

A restrictive reinforcing band in accordance with the present invention, but representing a variant embodiment, as illustrated in FIG. 4 and identified by the numeral 41. Like the band construction 31 of FIG. 3, the band 41 contains individual discrete, extremely short lengths of glass fiber filaments 41b and also a plurality of unseparated strands, bundles or cords 41c. The band 41 additionally includes a plurality of mutually parallel cords or strands 42 composed of assembled filaments, either twisted or untwisted. In each case, it is most preferred that the cords, strands or bundles 42 include an impregnation system as described hereinbefore in Examples 4–7. The band 41 can be manufactured by first drawing a plurality of strand or cord assemblies 71 (FIG. 10) from a plurality of rotatable supply spools 72 held in a "creel" arrangement 73 as in conventional textile practice, directing the strand or cord assemblies through a "comb" 74 and thence "training" the strands under and over an array of rollers arranged to direct the strands into a pool of impregnant 75, thence through a hot air oven 76 and finally through a calender 77 composed of a three roll stack; an elastomeric stock being fed to the top and middle rolls 78 and 79, respectively, while the strands are fed through the middle and bottom rolls 79 and 80, respectively, whereby the strands are combined with elastomeric stock to yield the assembly shown in FIG. 4. Alternatively, a restrictive band construction as shown in FIG. 4 can be formed by hand layup or by a laminating technique wherein two sheets of elastomeric stock have sandwiched therebetween a given number of mutually parallel strands of glass fiber.

It is within the purview of the present invention that the mutually parallel strands 42 may be the same or different fibers. Thus, instead of all being fiber glass, a proportion of the strands may be fiber glass and the balance "nylon," rayon, cotton or polyester. It is also within the purview of the present invention to form the cords, strands or cables 42 by employing a mixture of fibers representing three or more different materials, e.g., glass, cotton, rayon, "nylon," polyester, etc. Another variant embodiment for the restricting band embodying a reinforcement system in accordance with a further aspect of the present invention is illustrated in FIG. 5 wherein a band 51 (partially broken away) is shown. The band 51 employs discrete, extremely short lengths of glass filaments 51b and a somewhat greater proportion of unseparated cords or strands somewhat greater in length as described hereinbefore and being identified by the reference numeral 51c. These are in the form of impregnated strands, bundles or cords. In place of the mutually parallel strands 42 as in the embodiment of FIG. 4, the embodiment of FIG. 5 employs a woven fabric 52 embedded in the elastomeric stock component of the restrictive band 51. The fabric 52 is composed of woof strands 52a and cross or warp strands 52b. The fiber making up these should preferably be different where one is glass. Thus, most preferably, the strands 52a and 52b are not both glass strands. The warp and woof strands 52a and 52b may be strands of glass, "nylon," rayon, cotton, polyester ("Dacron") and any of the other alternative constructions mentioned hereinbefore. It is within the scope of the present invention to employ two or more of the candidate fibrous strand constructions to weave the fabric 52. As in the case of the mutually parallel strands 52, the fabric may be combined with the restrictive band in any one of the several ways described herein. Preferably, a calendering combination as described previously is employed, although a laminating technique, under certain circumstances, may prove most beneficial.

FIG. 8 illustrates a cord construction 60 in accordance with this invention; said cord employing twisted strands 61, 62, 63, 64, 65, 66 and 67. Each of the strands is composed of a plurality of assembled filaments. The cord 60 is shown assembled from a combination of strands of differing materials. Thus, certain of the strands 61–67 may be glass, a number of them may be cotton and a number of them may be "nylon," rayon polyester ("Dacron") or the like. It goes without saying, of course, that the cord or cable 60 may be made up of strands 61–67, all of the same filamentary material. Ideally, they are impregnated (see Examples 4–7) in a manner as described (in connection with FIG. 10), particularly where a glass strand is in assembly therewith. The cord or cable 60 may be employed in fabricating the restrictive belt or band 41 and, in which case, it would be substituted for the strands 42. Where different fibers, both organic and inorganic, are employed, a considerable versatility and flexibility in combination of properties is imparted to the restrictive band and correspondingly to the tire construction. It will also be appreciated that the cable 60 may be employed as one or the other or both of the strands 52a and 52b in the fabric 52 in the restrictive band 51 in the embodiment of FIG. 5.

In FIGS. 6 and 7, there is disclosed, somewhat schematically, a process and apparatus for retreading a tire in accordance with another embodiment of the present invention. Thus, a tire 90 is mounted on a flanged hub 91, carried rotatably on a shaft 92 mounted on either side in journals 93 and 94 respectively mounted on like supports 94 and 95. A pulley 96 is mounted at one end of the shaft 92 driven by a belt 97 mounted on pulley 98 driven via shaft 99 by a motor 100 connected to a source of electrical power, not shown. The tire mounted, as just discussed, may be rotated at any desired speed. In accordance with the present invention, a supply spool 100a containing a continuous length of previously impregnated glass cord or strand is mounted in spaced parallel relationship with the tire. The shaft 101 of this spool 100a is parallel to the shaft 92. A continuous length of the strand or cord is drawn from the spool and is fed through a traversing eyelet 102 mounted for to and fro travel on a threaded shaft 103, reversably turned by a motor 104 operating via a pair of pulleys 105 and 106 connected by a belt 107. The threading of shaft 103 and governing travel of eyelet 102 arrangement can be selected in order to give any desired spacing between the length of cord as it is fed peripherally onto the tire, as illustrated by the reference numeral 108

(FIG. 7), yielding a "filament wound" or "spiral wound" reinforcing strand as the tire 90 rotates along with the supply spool 100a. Another supply spool 110 contains a continuous supply of restrictive band stock material, such as that illustrated in either FIGS. 3, 4 or 5. Usually, the construction of FIG. 3, namely, the band 31, will suffice since the spiral wound continuous strand will take the place of the strands 42 in the restrictive band construction 41 of FIG. 4. The breaklines 111 illustrate that a band length 112 can be peripherally wrapped about the previously independently applied spiral strand or cord of glass. Of course, the band construction, as a very thin member, may be continously wound about the tire contemporaneously with the applied filament wound strand or cord. A further supply spool 120, shown in dotted outline in FIG. 6, represents that two or more strands of glass may be wound about the tire at the same time; care being taken, of course, to employ a separate eyelet traversing rod arrangement, as shown in FIG. 7. Once sufficient continuous glass strands have been spirally wrapped about the carcass, a final wrap of restrictive band 112 may be put about the structure and then the tread stock applied as in conventional retreading operations. The restrictive band alone may be wound about the carcass instead of in combination with the spiral or filament wound cord. Skive knives, although not shown, are usually employed to trim excess rubber from the tire, whereby molding is easier and dynamic stability of the ultimate retread is improved. It goes without saying that the tread, of course, is first buffed off of the tire 90 to be retread, and the reference numeral 90 represents a tire from which the tread has been removed by buffing in a truing and dynamically balanced apparatus.

Although not shown, it is within the purview of the present invention to employ a technique as generally illustrated schematically and described hereinabove in connection with FIGS. 6 and 7 for the original manufacture of tires; in other words, in the tire building process. Thus, it is within the framework of the present invention to adopt the procedure just described to a tire building operation generally similar to that employed in building radial tires. In such a technique, the tire components are built up on a drum or mandrel fitted with bead seal adapters permitting the partially built tire to be pneumatically expanded to a tire configuration whereupon the glass cord can be spirally wound about the crown of the carcass prior to application of the tread strip. Provision can be made for convenient supply rolls of glass cord together with apparatus including a traversing eyelet for feeding the glass cord assembly spirally onto the carcass in the crown region. As in the embodiment shown in FIGS. 6 and 7, we may employ one or more restrictive band members 112. This will tend to further insure isolation and separation of the strands, thereby precluding any interfilament, interstrand or intercord destruction. In any event, when sufficient wraps of the continuous spiral wound cord have been applied together with an optional cushioning layer of the restrictive band stock material 112, the suply rolls can be pivoted away and the tread stock applied in routine fashion followed by vulcanization in an appropriate mold.

The construction provided by this technique yields a tire possessed of considerable inherent stability just beneath the tread region by reason of the layer of spirally wound glass cords as described. The construction, as just described, finds particular utility in a bias ply cut "nylon" cord tire, since the continuous plies lend dimensional uniformity in so far as the tire diameter is concerned and additionally prevent growth of the tire due to any inherent thermal deficiency of the "nylon" cords.

Whether the tire, constructed in accordance with the present invention and the techniques just described, be a new tire manufactured on tire building equipment as just described or whether the tire be a retread tire buffed and constructed as just described, it is found that it is inherently a much more stable tire than known heretofore. Even with the added stability, however, it is found that the harshness of ride is not a necessarily accompanying factor as in the case of wire "breaker sirip" tires of the Michelin type.

Retreading operations employing the technique as just described results not only in a restrictive band in terms of tire size, but also in the creation of a shield which resists penetration by foreign objects frequently found on the air strip as described early in the present application.

The tire shown in FIG. 9 illustrates a variant construction featuring a tire 121 composed of spaced beads 122 and 123 connected by a carcass portion 124 which is a radial cord construction having mutually parallel cords 125 which proceed at an angle of 90° between beads 122 and 123; the 90° being taken with reference to the peripheral center line 126 of the tire. In accordance with the present invention, this radial cord may be "nylon," wire or glass cords impregnated as described. The tire includes a tread portion 127 which serves as the ground contacting component of the tire. In accordance with the present invention, just beneath the tread portion 127 and extending generally from shoulder 128 to shoulder 129, there is situated two restricting bands or belts 130 and 131; both of which are constructed in accordance with the details of construction described hereinbefore, particularly in connection with FIGS. 3, 4 and 5. The restrictive bands 130 and 131 may be individual separate bands which are positioned peripherally about the tire with chamfered overlapping ends offset one with respect to the other. Alternatively, the segments identified by the reference numerals 130 and 131 may, in fact, represent different plies of a multiple wrap-around of an elongate strip or band of a reinforcing restrictive band member composed, for example, of a construction as identified as 31 in FIG. 3, 41 in FIG. 4, or 51 in FIG. 5.

The tire construction embodying the constructional details identified in FIG. 9 is possessed of greater stability dynamically than the conventional radial tire. Additionally, the tire embodying the constructional details of FIG. 9 will not impart to the vehicle, upon which mounted, as harsh a ride as conventional radial tires of the Michelin type employing wire cords in the radial carcass ply and additionally wire reinforced elastomeric stock forming a belt or breaker strip assembly as, for example, noted in the patent to Bourdon, 2,894,555, mentioned earlier herein. It will be appreciated that the radial cords may extend from bead to bead or it may extend from one bead up through one shoulder across the tread area and down into the opposite side wall, while the opposite radial ply proceeds reversely from the opposite bead up through the shoulder area and down into the side wall area of the other ply. The just described configuration represents a two radial ply construction. The overlap in the tread portion tends to increase the stability in the tread region of the tire.

Modifications in constructional details, treatments and technique may be resorted to, and all such obvious equivalents are intended to be included within the scope of the present invention, unless the claims expressly delimit the scope otherwise.

We claim:

1. A tire construction having a tread, side walls and carcass body, said construction featuring a reinforcing system comprising a circumferential band located proximate said carcass and beneath said tread portion, said band being substantially laterally coextensive with said tread, said band having embedded therein a plurality of randomly oriented chopped lengths of gathered filaments of glass in the form of cords.

2. A tire construction as claimed in claim 1, wherein said carcass body is composed of bias cut nylon plies.

3. A tire construction as claimed in claim 1, wherein said band includes a plurality of chopped lengths of individual non-agglomerated filaments of glass.

4. A tire construction as claimed in claim 1, in which said cords constitute 5 to 75 phr. of elastomeric stock.

5. A tire construction as claimed in claim 4, in which said cords constitute 15 to 50 phr.

6. A tire construction having a tread, side walls and carcass body, said construction featuring a reinforcing system comprising a circumferential band of elastomeric stock located proximate said carcass and beneath said tread portion, said band being substantially laterally coextensive with said tread, said band having embedded therein a plurality of gathered filaments of fiber glass in the form of cords and/or bundles, said cords, etc., constituting 5 to 75 phr.

7. A tire construction as claimed in claim 6, wherein said carcass body is composed of bias cut nylon plies.

8. A tire construction as claimed in claim 6, wherein said cords, etc., measure from 1/8 to 3 inches in length.

9. A tire construction as claimed in claim 6, wherein said band includes a plurality of individual non-agglomerated filaments of glass fiber.

10. A tire construction having a tread, side walls and carcass body, said construction featuring a reinforcing system comprising a circumferential band of elastomeric stock located between said carcass and said tread portion, said band being substantially laterally coextensive with said tread, said band having embedded therein a plurality of mutually parallel strands of continuous inextensible strands including continuous strands of glass filaments, said strands being composed of gathered continuous filaments assembled into bundle-like configuration.

11. A tire construction having spaced beads, a toroidal carcass connecting said beads and a ground contacting tread, said construction including an annular, stability-imparting member peripherally located beneath and generally laterally coextensive with said tread and outwardly of said carcass, said member including at least one layer of spirally wound continuous cord formed of substantially inextensible material.

12. A tire construction as claimed in claim 11, wherein said member includes an elastomeric vulcanizable stock separating said cord.

13. A tire construction as claimed in claim 11, wherein said member includes more than one layer of spirally wound cord.

14. A tire construction as claimed in claim 13, wherein said construction includes a layer of elastomeric stock between radially spaced layers of said spirally wound cord.

15. In a tire construction featuring, as the principal carcass reinforcement, a plurality of bias cut plies of nylon cord, said tire including a tread portion, the improvement in construction which includes at least one circumferential band of elastomeric stock located between said bias plies and said tread, said band having embedded therein a plurality of mutually parallel strands of continuous inextensible strands including continuous strands of glass filaments.

16. A tire construction as claimed in claim 15, wherein said filaments in said strands are separated by an elastomeric impregnant.

17. A tire construction as claimed in claim 15, wherein said band includes a minor amount of filamentized discrete glass fibers and, in addition, a somewhat greater amount of chopped lengths of fiber glass in cord form.

18. A tire construction as claimed in claim 15, wherein said band includes 1 to 10 phr. of elastomeric stock of individual glass fibers measuring 1/64 to 1/4 inch in length and 5 to 75 phr. of elastomeric stock of chopped cord comprising unseparated bundles of glass filaments.

19. A tire construction as claimed in claim 15, wherein some of said strands are formed of a textile material selected from the group consisting of cotton, rayon, nylon, polyester and wire.

20. A tire construction as claimed in claim 19, wherein some of said strands are nylon.

21. A tire construction as claimed in claim 19, wherein some of said strands are rayon.

22. A tire construction as claimed in claim 19, wherein some of said strands are cotton.

23. A tire construction as claimed in claim 19, wherein some of said strands are polyester.

24. A tire construction as claimed in claim 19, wherein some of said strands are wire.

25. In a tire construction featuring, as the principal carcass reinforcement, a plurality of bias cut plies of organic cord, said tire including a tread portion, the improvement in construction which includes a circumferential band of elastomeric stock located between said bias plies and said tread, said band having embedded therein an amount of reinforcing filamentized discrete glass fibers and, in addition, an amount of reinforcing chopped lengths of fiber glass in cord form.

26. A tire construction as claimed in claim 25, wherein said band includes a plurality of mutually parallel strands of continuous inextensible strands including continuous strands of glass filaments.

27. A tire construction as claimed in claim 25, wherein said cords measure from 1/8 to 3 inches in length.

28. In a pneumatic tire construction comprising: a pair of parallel spaced, inextensible bead ring members adapted for engagement with the spaced circular rim portion of a wheel, a plurality of fabric carcass plies extending from bead to bead, generally in toroidal cross sectional configuration, and a peripheral tread member surrounding said carcass; said tread member constituting the ground contacting element of said tire, said pair of parallel spaced bead ring members and plurality of fabric carcass plies being embedded in an elastomeric stock and said peripheral tread member being formed of elastomeric material integrally united to said pair of parallel spaced bead ring members and said plurality of fabric carcass plies to define a tire adapted to be inflated with air; the improvement which includes an intermediate ply of elastomeric material, said material containing a plurality of discrete, filamentized glass fibers, said ply extending circumferentially about said tire between two of said fabric carcass plies and beneath the tread.

29. An improved tire construction as claimed in claim 28, wherein said intermediate ply lies radially between the uppermost carcass ply and the tread member.

30. An improved tire construction as claimed in claim 28, wherein said intermediate ply constitutes a linear belt-like member which extends circumferentially about said construction at least twice.

31. A tire construction comprising an elastomeric stock impregnated woven fabric ply including strands of glass and strands of another substance interwoven therewith, said substance being selected from the group consisting of nylon, cotton, rayon and polyester.

32. A radial tire construction including a tread, spaced beads, a radial cord carcass body connecting said tread and beads, and a circumferential restricting band member situated between said tread and the crown portion of said radial cord carcass, said band comprising elastomeric stock having embedded therein a plurality of randomly oriented chopped lengths of fiber glass in the form of cords.

33. A tire construction as claimed in claim 37, wherein said band includes 1 to 10 phr. of elastomeric stock of individual glass fibers measuring 1/64 to 1/4 inch in length and 5 to 75 phr. of elastomeric stock of chopped cord comprising unseparated bundles of plied glass filaments.

34. A radial tire construction as claimed in claim 32, in which said chopped lengths of cords constitute 5 to 75 phr.

35. A radial tire construction as claimed in claim 34, in which said chopped lengths of cords constitute 15 to 50 phr.

36. A radial tire construction as claimed in claim 35, wherein said band includes 1 to 10 phr. of individual glass fibers measuring 1/64 to 1/4 inches in length.

37. An improved tire construction as claimed in claim 25, wherein the amount of chopped lengths of cords is greater than the amount of discrete glass fibers.

References Cited by the Examiner

UNITED STATES PATENTS

| | | | |
|---|---|---|---|
| 1,441,514 | 1/1923 | Lister | 156—117 |
| 2,056,012 | 9/1936 | Madge et al. | 152—355 |
| 2,184,326 | 12/1939 | Thomas | 152—359 X |
| 2,224,274 | 12/1940 | Powers | 152—359 X |
| 2,411,659 | 11/1946 | Manning | 156—117 |
| 2,782,830 | 2/1957 | Wallace | 152—355 |
| 2,894,555 | 7/1959 | Bourdon | 152—361 |
| 3,095,027 | 6/1963 | Weber | 152—355 |
| 3,245,454 | 4/1966 | Lewis | 152—354 |

ARTHUR L. LA POINT, *Primary Examiner.*

C. W. HAEFELE, *Assistant Examiner.*